US012572994B2

(12) United States Patent
Song et al.

(10) Patent No.: US 12,572,994 B2
(45) Date of Patent: *Mar. 10, 2026

(54) ONLINE AUTHORIZATION SYSTEM

(71) Applicant: APEX TECHLINK, INC., Glendale, CA (US)

(72) Inventors: Yuh-shen Song, Porter Ranch, CA (US); Catherine Lew, Porter Ranch, CA (US); Alexander Song, Porter Ranch, CA (US); Victoria Song, Porter Ranch, CA (US)

(73) Assignee: APEX TECHLINK, INC., Glendale, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 18/412,185

(22) Filed: Jan. 12, 2024

(65) Prior Publication Data

US 2024/0153027 A1 May 9, 2024

Related U.S. Application Data

(63) Continuation of application No. 17/211,717, filed on Mar. 24, 2021, now Pat. No. 11,908,030, which is a
(Continued)

(51) Int. Cl.
*G06Q 50/26* (2012.01)
*G06Q 30/04* (2012.01)
(Continued)

(52) U.S. Cl.
CPC ........... *G06Q 50/265* (2013.01); *G06Q 30/04* (2013.01); *G06Q 30/0601* (2013.01); *G06Q 40/02* (2013.01)

(58) Field of Classification Search
CPC .. G06Q 50/265; G06Q 30/04; G06Q 30/0601; G06Q 40/02
(Continued)

(56) References Cited

U.S. PATENT DOCUMENTS

| | | | |
|---|---|---|---|
| 4,961,142 A | 10/1990 | Elliot et al. | |
| 6,224,109 B1 | 5/2001 | Yang | |

(Continued)

OTHER PUBLICATIONS

US 6,861,610 B1, 03/2005, Shuster (withdrawn)

*Primary Examiner* — Daniel A Hess
(74) *Attorney, Agent, or Firm* — Seyfarth Shaw LLP

(57) ABSTRACT

A computer-implemented method validates a user instruction by storing, at a first computer system, a transformation method associated with account information of the user, and associated with a government issued identification document of the user, the account information obtained from an item issued by a financial institution. The computer-implemented method also receives, at the first computer system from a second computer system, the account information and a message electronically transformed from the user instruction by the transformation method based on the government issued identification document of the user. The user instruction is unrecognizable from the message. The computer-implemented method transforms, at the first computer system, the message into the user instruction with the transformation method retrieved based on the received account information. The computer-implemented method approves an action based on the user instruction.

11 Claims, 9 Drawing Sheets

Related U.S. Application Data continuation of application No. 16/714,557, filed on Dec. 13, 2019, now Pat. No. 10,991,062, which is a continuation of application No. 16/022,205, filed on Jun. 28, 2018, now Pat. No. 10,540,732, which is a continuation of application No. 15/424,664, filed on Feb. 3, 2017, now Pat. No. 10,032,238, which is a continuation of application No. 12/726,278, filed on Mar. 17, 2010, now Pat. No. 9,600,837, which is a continuation of application No. 11/620,614, filed on Jan. 5, 2007, now Pat. No. 7,717,337.

(60) Provisional application No. 60/859,016, filed on Nov. 15, 2006.

(51) Int. Cl.
  *G06Q 30/0601*         (2023.01)
  *G06Q 40/02*            (2023.01)

(58) Field of Classification Search
  USPC ........................................................... 705/26
  See application file for complete search history.

(56)                References Cited

U.S. PATENT DOCUMENTS

| | | | |
|---|---|---|---|
| 7,191,941 B1 | 3/2007 | Mollett | |
| 7,717,337 B2 | 5/2010 | Song et al. | |
| 9,600,837 B2 | 3/2017 | Song et al. | |
| 10,032,238 B2 | 7/2018 | Song et al. | |
| 10,540,732 B2 | 1/2020 | Song et al. | |
| 10,991,062 B2 | 4/2021 | Song et al. | |
| 11,908,030 B2 * | 2/2024 | Song | G06Q 40/02 |
| 2002/0147679 A1 | 10/2002 | Tardiff | |
| 2003/0150907 A1 | 8/2003 | Metcalf et al. | |
| 2003/0187790 A1 | 10/2003 | Swift et al. | |
| 2005/0274797 A1 | 12/2005 | Mollett et al. | |
| 2006/0054688 A1 | 3/2006 | Rose | |
| 2006/0293989 A1 | 12/2006 | Morrison et al. | |

\* cited by examiner

2

2010 FINANCIAL INSTITUTION USES THE KEY TO DECRYPT ENCRYPTED TRANSACTION PACKET

2011 IS THE KEY CORRECT?     NO 2013

YES 2012

2014 EMBEDDED IDENTIFICATION INFORMATION MATCHES THE RECORD?     NO 2016

YES 2015

2017 TRANSACTION CAN BE PERMITTED AND COMPLIES WITH REGULATION?     NO 2019

YES 2018     2021

2020 APPROVE THE TRANSACTION     INFORM MERCHANT TO REJECT THE TRANSACTION

END OF TRANSACTION

ONLINE AUTHORIZATION SYSTEM

CROSS REFERENCE TO RELATED APPLICATIONS

This application is a continuation of U.S. patent application Ser. No. 17/211,717, to Song et al., filed on Mar. 24, 2021, which is a continuation of U.S. patent application Ser. No. 16/714,557, to Song et al., filed on Dec. 13, 2019, now U.S. Pat. No. 10,991,062, which is a continuation of U.S. patent application Ser. No. 16/022,205, to Song et al., filed on Jun. 28, 2018, now U.S. Pat. No. 10,540,732, which is a continuation of U.S. patent application Ser. No. 15/424,664, to Song et al., filed on Feb. 3, 2017, now U.S. Pat. No. 10,032,238, which is a continuation of U.S. patent application Ser. No. 12/726,278, to Song et al., filed on Mar. 17, 2010, now U.S. Pat. No. 9,600,837, which is a continuation of U.S. patent application Ser. No. 11/620,614, to Song et al., filed on Jan. 5, 2007, now U.S. Pat. No. 7,717,337, which claims the benefit of U.S. Provisional Application No. 60/859,016, to Song et al., filed on Nov. 15, 2006, the disclosures of which are expressly incorporated by reference herein in their entireties.

FIELD

The present disclosure relates generally to conducting online transactions through networked device interfaces. More specifically, the present disclosure provides methodology to facilitate anti-money laundering, anti-terrorist financing and other anti-crimes measures and to reduce crimes in online transactions activities such as online banking, trading, money transfer, shopping, payment, financial transactions, electronic money services transactions, etc.

BACKGROUND

By the year end of 2006, tens of millions of U.S. consumers have already suffered from identity theft at least once in their lives. A very common and simple scheme used by con artists is to steal the credit/debit card or checking account number and name from a consumer. This can be easily done, for example, through the waiters or cashiers in restaurants, hotels, or stores. The con artist then collects the personal background information of the account holder from the Internet. This can also be easily done today. After using the account holder's background information to open many accounts with online merchants based on the stolen credit/debit card or checking account number, the con artist quickly conducts a shopping spree before the financial institution, which issued the credit/debit or checking account, has detected the fraudulent activities and closed the account.

In addition to fraud in online shopping activities, con artists can easily steal the user ID and password from an account holder of a financial institution by either traditional approaches such as buying the information from dishonest employees, or by technology-based schemes, such as phishing. Once the con artists obtain the user ID and password, they can do almost anything they want with the financial account. In fact, many financial institutions have disclaimed their liabilities if the financial losses are caused by stolen user ID and password at no fault of the financial institution. As a result, many consumers have become innocent victims of the fraud.

To further complicate matters, some dishonest consumers may also deny their own online activities by claiming that they are the victims of identity theft.

Billions of dollars have been lost every year through these fraudulent online activities. In addition to financial losses, it is a time-consuming and painstaking process for a victim to clear his/her bad records and credit history.

Moreover, in addition to the traditional online financial transactions such as bill payment, online person-to-person money transfer such as the services provided by PayPal, Money Gram, etc., can also be easily used to conduct money laundering and terrorist financing activities. Since most online money services businesses cannot really verify the true identity of an account holder, a terrorist or other criminal can easily open an account with online money services businesses based on fake identification information and any email address, then send money to another terrorist or criminal through online money services businesses. As a result, our national security is also under severe threat by these online fraudulent activities.

Therefore, there is an urgent need for governments, financial institutions, merchants, and consumers to eliminate these crimes and online fraudulent activities.

Several methods have already been proposed by different inventors in the past. For example, it was suggested that a consumer can store his/her biometrical information, e.g., fingerprint, in the commercial database of a merchant or a financial institution and such biometrical information can be used to authenticate the consumer's identity before completing online transactions. One problem with this approach is that biometrical information is guarded by most consumers as private and confidential information and thus biometrical authentication is not generally accepted by consumers.

Besides, it is relatively easy for an experienced con artist to steal the biometrical information from a person as we have already seen in many movies. Moreover, once the biometrical information is stolen from a person, there is not much this person can do to fix the problem. For example, if a person's fingerprint is stolen, the person cannot cut off his/her finger or somehow change his/her fingerprint. In other words, biometrical authentication may actually induce permanent damage to a person's biometrical identity.

It has been proposed to use an Integrated Circuit ("IC") card issued by a financial institution which contains the private key of a private-public key pair. The private key is used to encrypt the electronic message which the IC card holder gives to the financial institution to conduct an e-commerce transaction. When the financial institution receives the electronic message, the financial institution will use the public key of the private-public pair to decrypt the electronic message which was encrypted by the private key and conduct the transaction according to the instruction given by the IC card holder.

In essence, the known system uses the private key inside the IC card to determine whether the IC card holder has the authority to give instructions for a specific account. Therefore, the private key has the same effect as an identification number of the IC card holder. Although the private key is embedded inside the IC card and is not easily available, such a key is a "fixed" key for each account holder. With the expected advances in computer technology, it is just a matter of time before con artists will be able to decode such an encrypted message and figure out what the private key is. Once the con artist has obtained the private key, the con artist can duplicate the key and conduct fraudulent online transactions based on this key.

Furthermore, there are some additional burdens in this approach. The keys used in private-public key cryptography have some mathematical structure. For example, public keys used in the RSA system are the product of two large prime numbers. Thus, public key systems require longer key lengths than symmetric systems for an equivalent level of security. A key length of 3072 bits is suggested for systems based on factoring and integer discrete algorithms which aim to have security equivalent to a 128-bit symmetric cipher. In other words, private-public key systems will become very expensive because they demand a tremendous amount of computer processing power for each online transaction.

Moreover, a monumental effort will be required to replace the existing systems in the financial institutions, and each consumer will have to go through a complicated account opening process to obtain a special IC card with a private key from one or more of the financial institutions before he/she can conduct online transactions. Since such IC cards are granted a great deal of authority in financial transactions, distributing such keys require special processes and extra caution.

More seriously, if fake or stolen identification information has been used to obtain the IC card, it can be easily used by money launderers or terrorists to conduct money laundering and terrorist financing activities because the identity of the account holder is not truly identified. For example, a notorious terrorist can use that IC card to conduct all kinds of online transactions under the cover of another person who actually opened the account.

Since the 9/11 tragedy, many governments have strictly enforced anti-money laundering and anti-terrorist financing laws. In fact, a large number of financial institutions in the USA have already received an aggregate amount of hundreds of millions of dollars of penalties due to their failure to enforce anti-money laundering and anti-terrorist financing measures as required by laws. Compliance with anti-money laundering and anti-terrorist financing regulatory requirements has become the top priority for financial institutions in the USA. Identifying the true identity of a person who conducts the transaction is essential to enforcing anti-money laundering and anti-terrorist financing measures.

Although biometrical information can be used to ensure that an IC card holder is also the true owner of the IC card, as explained before, such a use of biometrical information is not generally accepted because of privacy concerns. And without adequate verification of the user's identity, a conventional IC card will only open a new door for money launderers and terrorists.

Most governments have imposed anti-money laundering, anti-terrorist financing, and other anti-crimes obligations upon financial institutions to monitor transactions. These financial institutions have to, for example, (1) verify and record the identification information of all parties in the transaction, (2) check all parties of the transaction against the "blacklists" published by various governments and report or block the transaction, and (3) detect any suspicious activity and report it to the government agencies.

The scope of transactional monitoring as required by law is actually very broad. For example, if a financial institution has identified that several different customers are sending money to the same recipient and the aggregate amount is very large, the financial institution has to study who the recipient is and whether they are financing terrorist activities. If the financial institution identifies any suspicious activity, the financial institution has to report the case to government agencies.

If the financial institution identifies that a customer is sending a wire transfer to a recipient, whose name somehow is very similar to a name on a blacklist published by the government, the financial institution cannot send the wire transfer out until it has proven that such a recipient is not the person on the blacklist.

Although it is required by laws, transactional monitoring is not possible in today's online transactions because the financial institution cannot verify who the remote parties really are. Consequently, financial institutions cannot really fulfill their legal obligation to enforce anti-money laundering, anti-terrorist financing and other anti-crimes measures in online transactions.

Furthermore, many con artists are utilizing this weakness of the financial industry to commit all kinds of fraudulent activities. The present disclosure intends to enable financial institutions to fulfill their legal obligation and, at the same time, to reduce all fraudulent activities.

With modern technologies, government authorities can store a great deal of machine-readable personal identification information within a person's official identification document. For example, the stored identification information may include name, date of birth, identification number, social security number, address, expiration date, biometrical information such as a fingerprint, an iris pattern, a picture, etc.

Encryption has been used often in data transmission for security purposes. However, it has become much easier to decode an encrypted message with today's advanced computer technology. In a recent competition, an encrypted message based on Data Encryption Standard ("DES"), which was once the national standard adopted by the US government, was decoded by experts within less than 24 hours.

Since it takes time for a perpetrator to decode an encrypted message, it is desirable to change the encryption key frequently. If the sender and recipient are notified of the key information whenever a new key is used, the sender and the recipient can always know what the current key is. However, such a key change notification is practically impossible when a large number of users are involved.

In this document, the terminology "network" or "networks" generally refers to a communication network or networks, which can be wireless or wired, private or public, or a combination of them, and includes the well-known Internet.

In this document, the terminology "computer" or "computer system" generally refers to either one computer or a group of computers, which may work alone or work together to accomplish the purposes of the system.

In this document, the terminology "processor" generally refers to either one processor or a group of processors, which may work alone or work together to accomplish the purposes of the computer system.

In this document, the terminology "network" or "computer network" generally refers to either one network or a group of connected networks, which may work alone or work together to accomplish the purposes of the network.

In this document, a "bank" or "financial institution" is generally referred to as a "financial service provider," which encompasses either a bank or a non-bank where financial services are provided.

In this document, a "bank account" or "financial account" is generally referred to as an "account for financial transactions," and encompasses accounts in either a bank or a non-bank where financial transactions are conducted by means of financial instruments such as cash, checks, credit cards, debit cards, gift cards, stored value cards, pre-paid cards, monetary instruments, electronic fund transfers, letter of credit, notes, securities, commercial papers, commodities, precious metal, electronic fund transfers, automatic clearing house, etc.

In this document, "financial transactions" generally refer to transactions related to financial activities, including but not limited to payment, fund transfer, money services, payroll, invoicing, trading, escrow, insurance, underwriting, merger, acquisition, account opening, account closing, etc.

In this document, "trading" generally refers to trading activities, both private and public, including but not limited to trading of stock, currency, commodities, rights, values, securities, derivatives, goods, services, merchandise, etc.

In this document, "securities" are generally referred to according to the definition in the Securities Act of 1933. For example, securities may generally include note, stock certificate, bond, debenture, check, draft, warrant, traveler's check, letter of credit, warehouse receipt, negotiable bill of lading, evidence of indebtedness, certificate of interest or participation in any profit-sharing agreement, collateral-trust certificate, pre-organization certificate or subscription, transferable share, investment contract, voting-trust certificate; valid or blank motor vehicle title; certificate of interest in property, tangible or intangible; instrument or document or writing evidencing ownership of goods, wares, and merchandise, or transferring or assigning any right, title, or interest in or to goods, wares, and merchandise; or, in general, any instrument commonly known as a "security", or any certificate of interest or participation in, temporary or interim certificate for, receipt for, warrant, or right to subscribe to or purchase any of the foregoing.

In this document, "money services" are generally referred to money-related services such as money transfer, bill payments, check cashing, gift card purchase, etc.

In this document, a "symmetric encryption algorithm" is generally referred to an encryption algorithm which uses the same key to encrypt and decrypt the data. For clarification purposes, an encryption algorithm using a private-public key pair to encrypt and/or decrypt the data is not a symmetric encryption algorithm.

In this document, the terminology "online transactions" generally refer to all the transactions that can be conducted through a device interface connected to a network or a group of networks.

In this document, a "device interface" generally refers to a keyboard, a keypad, a monitor, a display, a terminal, a computer, a control panel, a vehicle dash board, a network interface, a machinery interface, a video interface, an audio interface, an electrical interface, an electronic interface, a magnetic interface, an electromagnetic interface including electromagnetic wave interface, an optical interface, a light interface, an acoustic interface, a video interface, an audio interface, a contactless interface, a mobile phone interface, a smartphone interface, a smartbook interface, other communication device interface, a Personal Digital Assistant (PDA) interface, a handheld device interface, a portable device interface, a wireless interface, a wired interface, and other interfaces.

In this document, the terminology "terminal," "self-service terminal," or "kiosk" generally refers to a piece of equipment, including a computer and/or its peripherals, microprocessor and/or its peripherals, ATM terminal, check-cashing kiosk, money services kiosk, merchant checkout stand, cash register, coin exchange machine, parking lot payment kiosk, other payment kiosks, contactless device, wire line phone, mobile phone, smartphone, smartbook, personal communication device, PDA, digital assistant, entertainment device, network interface device, router, and/ or Personal Digital Assistant (PDA), etc., which interfaces a user with a computer network, so that the user may interact with computer systems and other equipment connected to the computer network.

In this document, the terminology "PDA" or "Personal Digital Assistant" generally refers to a portable device which interfaces a user with a computer network, so that the user may interact with computer systems and other equipment connected to the computer network.

In this document, the terminology "machine-readable" generally includes all the reading methods that can be conducted by machine through a variety of media such as electronic, magnetic, electro-magnetic, optical, acoustic, etc. and a combination of them. In this document, the terminology "official identification document" generally refers to a passport, a driver's license, an alien registration card, a state issued ID, voter card, benefits card, student identification card, social security card, national identification card, an identity card, a certificate of legal status, and other official documents and information bearing instruments that identify a designated individual by certain verifiable characteristics, that are issued or certified by a consulate, embassy, government agency, or other governmental authority, and that are protected against unauthorized copying or alteration by the responsible government or authority. In particular, such "official identification documents" can be formed from various materials and can embed the identification information in various formats, including printed or embossed on the document (or card), written on a magnetic medium, programmed into an electronic device, stored in a memory chip, and combinations thereof. The "identification information" may include, but is not necessarily limited to, names, date of birth, identification numbers, tax identification number, expiration date, signatures, addresses, passwords, phone numbers, email addresses, personal identification numbers, national identification numbers, countries that issue the IDs, states that issue the IDs, photographs, fingerprints, iris scans, physical descriptions, and other biometric information. The embedded information can be read through optical, acoustic, electronic, magnetic, electromagnetic, and other media.

SUMMARY

In one aspect of the present disclosure, a method for processing online transactions is disclosed. The method includes receiving account identification information and second data. The second data is transformed from first data via a first transformation controlled by first identification information obtained from an identification document of a first person. In one configuration, the identification document is a driver's license, a passport, an alien identification card, a resident identification card, a student identification card, a national identification card, a state identification card, an insurance identification card, a social security identification card, a voter identification card, and/or a certificate of legal status. The method also includes identifying second identification information of a second person stored with an account based on the account identification information. The method further includes transforming the second data to the first data via a second transformation controlled by the second identification information. The method still further includes performing an action associated with the first data.

Another aspect of the present disclosure is directed to an apparatus including means for receiving account identification information and second data. The second data is transformed from first data via a first transformation controlled by first identification information obtained from an identification document of a first person. In one configuration, the identification document is a driver's license, a passport, an alien identification card, a resident identification card, a student identification card, a national identification card, a state identification card, an insurance identification card, a social security identification card, a voter identification card, and/or a certificate of legal status. The apparatus also includes means for identifying second identification information of a second person stored with an account based on the account identification information. The apparatus further includes means for transforming the second data to the first data via a second transformation controlled by the second identification information. The apparatus still further includes means for performing an action associated with the first data.

In another aspect of the present disclosure, a non-transitory computer-readable medium with program code recorded thereon is disclosed. The program code for processing online transactions is executed by at least one processor and includes program code to receive account identification information and second data. The second data is transformed from first data via a first transformation controlled by first identification information obtained from an identification document of a first person. The second data is transformed from first data comprising first identification information obtained from an identification document of a first person. In one configuration, the identification document is a driver's license, a passport, an alien identification card, a resident identification card, a student identification card, a national identification card, a state identification card, an insurance identification card, a social security identification card, a voter identification card, and/or a certificate of legal status. The program code also includes program code to identify second identification information of a second person stored with an account based on the account identification information. The program code further includes program code to transform the second data to the first data via a second transformation controlled by the second identification information. The program code still further includes program code to perform an action associated with the first data.

Another aspect of the present disclosure is directed to an apparatus for processing online transactions, the apparatus having a memory unit and one or more processors coupled to the memory unit. The processor(s) is configured to receive account identification information and second data. The second data is transformed from first data via a first transformation controlled by first identification information obtained from an identification document of a first person. In one configuration, the identification document is a driver's license, a passport, an alien identification card, a resident identification card, a student identification card, a national identification card, a state identification card, an insurance identification card, a social security identification card, a voter identification card, and/or a certificate of legal status. The processor(s) is also configured to identify second identification information of a second person stored with an account based on the account identification information. The processor(s) is further configured to transform the second data to the first data via a second transformation controlled by the second identification information. The processor(s) is still further configured to perform an action associated with the first data.

One objective of the present disclosure is to facilitate enforcement of anti-money laundering, anti-terrorist financing and other anti-crimes laws to further enhance national security.

Another objective of the present disclosure is to reduce fraud in financial transactions activities such as online banking, trading, shopping, money services, payments, etc.

The present disclosure is capable of using existing financial industry infrastructure to eliminate most online fraudulent activities. Governments can further enhance national security, financial institutions and merchants can reduce or eliminate financial losses, and consumers can enjoy the convenience of conducting financial transactions with peace of mind.

In one relatively simple embodiment, by incorporating or connecting a known reader within a known device interface such as a computer, monitor, keyboard, mouse, kiosk, terminal, cell phone, PDA, Automated Teller Machine, kiosk, etc., the device interface can read the identification information embedded inside the government issued official identification document and send such identification information to the financial institution for identity verification and transactional monitoring purposes.

However, many online transactions are conducted between consumers and counter parties, e.g., online merchants, online money services businesses, etc., which did not really issue the financial accounts used by the consumers. If the embedded identification information is provided to these counter parties, there is a chance that these counter parties can commit fraud based on this identification information. Therefore, in one embodiment of the present disclosure, the embedded identification information read from the machine-readable government issued official identification document and transactional details agreed by the consumers are encrypted so that the counter parties cannot commit any fraud.

However, if the same key is always used for this encryption process, it is just a matter of time before con artists will decode the messages and will identify the key by using today's advanced computer technology. Thus, to further increase the security, in one embodiment of the present disclosure, a "dynamic key" approach is used so that a new key is used for each new transaction with the key being dynamically produced based on a pre-agreed transformation of the basic information known to both parties for each particular event.

In another embodiment of the present disclosure, a "dynamic key" can be produced by selecting one out of many keys in each transaction and the selection process is determined using information already known to both parties. In particular, an encryption key can be dynamically constructed based on the embedded identification information read from the consumer's machine-readable government issued official identification document, and the decryption key can be dynamically reconstructed based on the identification information of the account holder stored in the database of the financial institution as identified by the account number.

In another embodiment of the present disclosure, an encryption key can be dynamically constructed based on the combined information of the embedded identification information read from the consumer's machine-readable government issued official identification document and the "time stamp" of the transaction, and the decryption key can be dynamically reconstructed based on the combined information of the identification information of the account holder stored in the database of the financial institution as identified by the account number and the time stamp of the transaction.

In an alternative embodiment of the present disclosure, an encryption key can be dynamically constructed based on the combined information of the embedded identification information read from the consumer's machine-readable government issued official identification document and a piece of "auxiliary information" which may change randomly in each transaction, and the decryption key can be dynamically reconstructed based on the combined information of the identification information of the account holder stored in the database of the financial institution as identified by the account number and the piece of auxiliary information which is unencrypted and sent together with the encrypted information.

Therefore, as a result of these and other embodiments (both separately and in combination), the present disclosure can further reduce crimes to enhance national security and eliminate fraudulent activities in online transactions.

Figure 1:
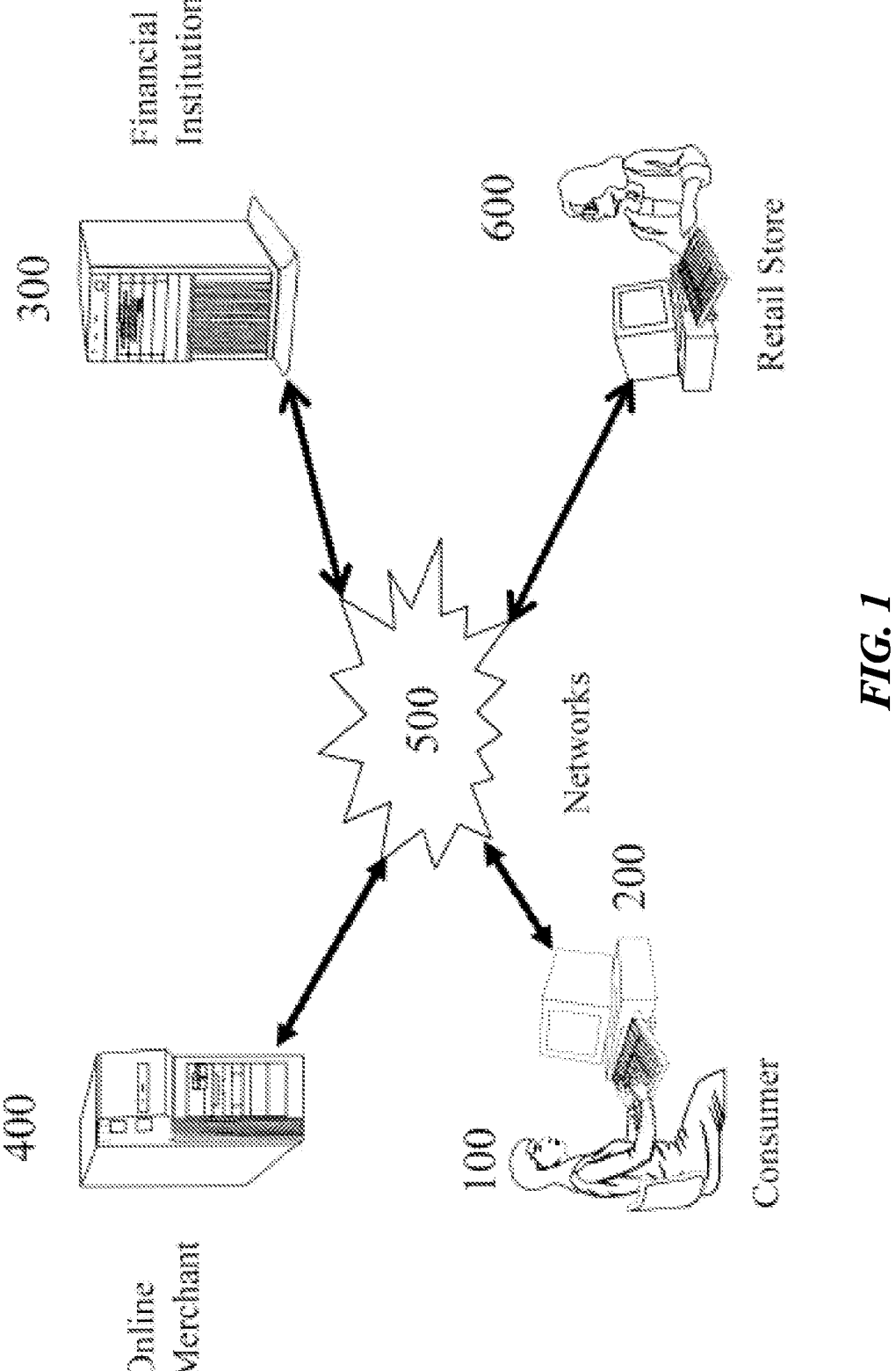
FIG. 1 illustrates the system and network diagram of an exemplary Anti-Crimes Online Transaction System, which enables a person to conduct online shopping transactions with the provisions to strengthen the national security and reduce fraudulent activities.

DETAILED DESCRIPTION OF CERTAIN PREFERRED EMBODIMENTS AND COMBINATIONS OF EMBODIMENTS

Although we contemplate that the present disclosure will in practice be used in many different environments and will be manifested in numerous embodiments, we will describe in detail only a few exemplary presently preferred embodiments of the present disclosure and certain exemplary combinations of those embodiments. Moreover, although we use consumers, merchants, money services businesses, and financial institutions as examples in this document for easy explanation, the present disclosure can be used for many kinds of online transactions activities even if consumers, merchants, money services businesses, and financial institutions are not involved.

Our described Anti-Crimes Online Transaction System intends to strengthen national security and reduce online fraudulent activities based on the existing infrastructure of the financial industry so that this system can be quickly deployed in a practical manner.

In one embodiment of the present disclosure, a consumer conducts an online transaction using the traditional process through a networked device interface (such as a computer, a PDA, a cell phone, etc.). However, such device interface has incorporated or is connected to a reader to read the embedded information from a machine-readable government issued official identification document. During the transaction, the reader will read the consumer's government issued official identification document so that the device interface can send the embedded identification information of the consumer to the counter party for verification.

In one embodiment of the present disclosure, if the counter party has issued the financial account used by the consumer, such counter party can directly perform identity verification to determine whether a user is authorized to use a particular account by comparing whether the received embedded identification information read from the user's machine-readable government issued official identification document matches the identification information of the account holder stored in the database of the financial institution as identified by the account number. If (1) the identity verification is successful (i.e., it is a match), and (2) the status of the account permits such transaction, and (3) none of the parties in the transaction matches the blacklists published by governments, the financial institution will continue to complete the transaction.

Depending on the regulation, if there is a match between any party of the transaction and a particular blacklist published by the government, the financial institution may have the obligation to block the transaction. It is also possible that, depending on the regulation, the financial institution may still complete the transaction if there is a match between any party of the transaction and a particular blacklist published by the government. However, the financial institution may have the obligation to report such case to the authorized government agencies in compliance with laws. In short, the proper action that a financial institution has to take after identifying a match between any party of the transaction and a blacklist published by the government will depend on the government regulation.

In another embodiment of the present disclosure, if the counter party did not issue the financial account of the consumer (e.g., the counter party is a retail store during a point of sale transaction, an online merchant during an online shopping transaction or a Money Services Business during a money service transaction), such a counter party can forward the embedded identification information of the consumer to the financial institution, which has issued the financial account to the consumer, for identity verification purposes. If (1) the identify verification is successful (i.e., it is a match), and (2) the status of the account permits such transaction, and (3) none of the parties in the transaction matches the blacklists published by governments, the financial institution will inform the counter party to complete the transaction.

Since the government issued official identification document is used in the transaction, financial institutions can easily identify the parties in the transaction in compliance with anti-money laundering, anti-terrorist financing, and other anti-crimes regulatory requirements. Therefore, the present disclosure makes it possible for the financial institutions to fulfill their obligations as required by laws.

Furthermore, the involved financial institution only has the usual responsibility for maintaining the account and conducting transactional monitoring, while the government continues to be responsible for ensuring the integrity of the government issued official identification document, there is no change to the existing infrastructure. As a result, the present disclosure can be easily deployed by financial institutions and quickly accepted by consumers.

Since the government has a very tight control over its government issued official identification document and such infrastructure has been in place for many years, it is reasonable to assume that each government issued official identification document is unique and that each person can be accurately identified.

As a result of the present disclosure, financial institutions can automatically verify that the person conducting a transaction from the selected account is properly authorized to make such a transaction by simply verifying that the embedded identification information read from the government issued identification card matches the account holder information of the identified account stored in the database of the financial institution. In addition, financial institutions can easily monitor the transactions as required by laws.

Because it is a government issued official identification document and presumably used for government purposes, the recited "government issued official identification document" and its "embedded identification information" will typically be protected not only by a number of stringent security measures to prevent illegal copying or counterfeiting, but also by vigorous investigation of any suspected violations of the criminal law by the government personnel responsible for maintaining the integrity of the government issued official identification documents.

Moreover, consumers know the importance of protecting their official identification documents which are required in many occasions of our daily lives such as checking in a hotel, boarding a flight, purchasing goods and services, etc. In the unlikely event that such a government issued official identification document is lost or stolen, there is a high probability that the loss will be promptly noticed by the owner of the government issued official identification document and reported to the issuing authority.

In particular, even if the account information is stolen through identity theft, it is highly improbable that the thief will have physical possession of the account holder's government issued official identification document without being noticed and reported by the account holder to the government. Therefore, the present disclosure is capable of making significant reductions in the damages caused by identity theft.

The security level may be further enhanced by requesting the user to enter some unique information belonging to personal knowledge such as password, social security number, etc. In the event that biometrical information becomes acceptable to consumers, it will also be practical to include biometrical information obtained from the user during the course of the verification process to make sure that the government issued official identification document is used by the true owner of such document.

In a standard online transaction, encryption of the communication channel between two directly-connected parties, such as the consumer and the online merchant, is commonly used to protect the data communicated inside the channel. For example, SSL is commonly used for such purposes.

Although the great majority of commercial users will operate in accordance with all applicable laws, some counter parties can also cheat in online transactions. For example, a dishonest merchant can use the financial account information and the customer's identification information to complete another transaction without the customer's consent. Although financial institutions can control merchants to a certain degree to avoid this kind of fraud, a merchant before filing bankruptcy may ignore any restriction from the financial institutions. Besides, con artists and other criminals can also employ identity theft and other illegal practices to become merchants. Therefore, there is a need to eliminate the fraud committed by the counter party which did not issue the financial account.

To reach this fraud prevention purpose, protecting the integrity of the data communicated indirectly between a consumer and a financial institution through the counter party is one of the goals of the present disclosure. In one embodiment of the present disclosure, the embedded identification information read from the machine-readable government issued official identification document and the transactional details agreed upon by the consumer are encrypted (referred to as "Encrypted Transaction Packet") before being sent to the online counter party, which will forward the Encrypted Transaction Packet to the financial institution that has issued the financial account to the consumer. Since the information is encrypted, the online counter party is prevented from committing any fraud.

However, if the same key is used for encryption all the time, it is possible for a con artist to figure out what this "fixed" encryption key is through computer technology. Once the key is identified, con artists can either decrypt the Encrypted Transaction Packet to modify the transactional details or produce a counterfeit Encrypted Transaction Packet to commit fraud.

In one embodiment of the present disclosure, the "encryption key" is produced by transforming the embedded identification information of the consumer's machine-readable government issued official identification document based on a set of pre-determined rules ("Transformation Rules"). For example, a key of 128 bits in length can be produced by using a set of pre-determined rules to randomly choose 16 bytes ($8*16=128$ bits) from the embedded identification information and manipulating these 128 bits based on the set of pre-determined rules such that the encryption key has little correlation with the embedded identification information of the consumer.

For example, a simple set of rules can be "(1) selecting the $3^{rd}$, $10^{th}$, $12^{th}$, $18^{th}$, $22^{nd}$, $24^{th}$, $27^{th}$, $31^{st}$, $33^{rd}$, $38^{th}$, $42^{nd}$, $46^{th}$, $52^{nd}$, $59^{th}$, $64^{th}$, and $73^{rd}$ characters from the identification data to form a string of bits, (2) rotating the string to the right by 3 bits, then (3) taking one's complement of the rotated bit string. After this transformation, these 128 bits, which have little correlation with the original embedded identification information, can be used as an encryption key.

Since the financial institution which receives the Encrypted Transaction Packet, can locate the same identification information in its own database according to the account number, the financial institution can reconstruct the same key based on the said set of Transformation Rules. If the consumer is not the correct account holder identified by the account number, the financial institution will not be able to reconstruct the key to correctly decrypt the received data and the financial institution should reject the transaction.

In this process, the online merchants and con artists cannot reconstruct the same key because they do not have all the identification information of the account holder which is either encrypted inside the Encrypted Transaction Packet or is not required for the transaction (e.g., date of birth of the account holder). More importantly, online merchants and con artists do not know the said set of Transformation Rules. This embodiment can ensure that each consumer has a different key from others because each consumer has a different set of identification information.

To increase the secrecy of the Encrypted Transaction Packet, in one embodiment of the present disclosure, a set of randomly generated alpha-numerical characters can also be mixed inside the data based on a set of pre-determined rules before composing the Encrypted Transaction Packet so that even the same consumer with the same identification information and the same transaction details will have different Encrypted Transaction Packets for different transactions.

Since a set of pre-determined rules is used to mix the data, the recipient can easily remove the inserted alpha-numerical characters to recover the original message. This embodiment will make it even more difficult for any con artist to decode the Encrypted Transaction Packet.

To further increase the security of the present disclosure, in one embodiment of the present disclosure, a set of characters (referred to as the "Control Characters") is randomly produced as the input to a pre-determined algorithm ("Rule Generating Algorithm"). The Rule Generating Algorithm is designed in such a way that different sets of Transformation Rules are generated based on different sets of Control Characters. The generated set of Transformation Rules is used to transform the embedded identification information read from the machine-readable government issued official identification document into an encryption key, which will be used to produce the Encrypted Transaction Packet.

Figure 5:
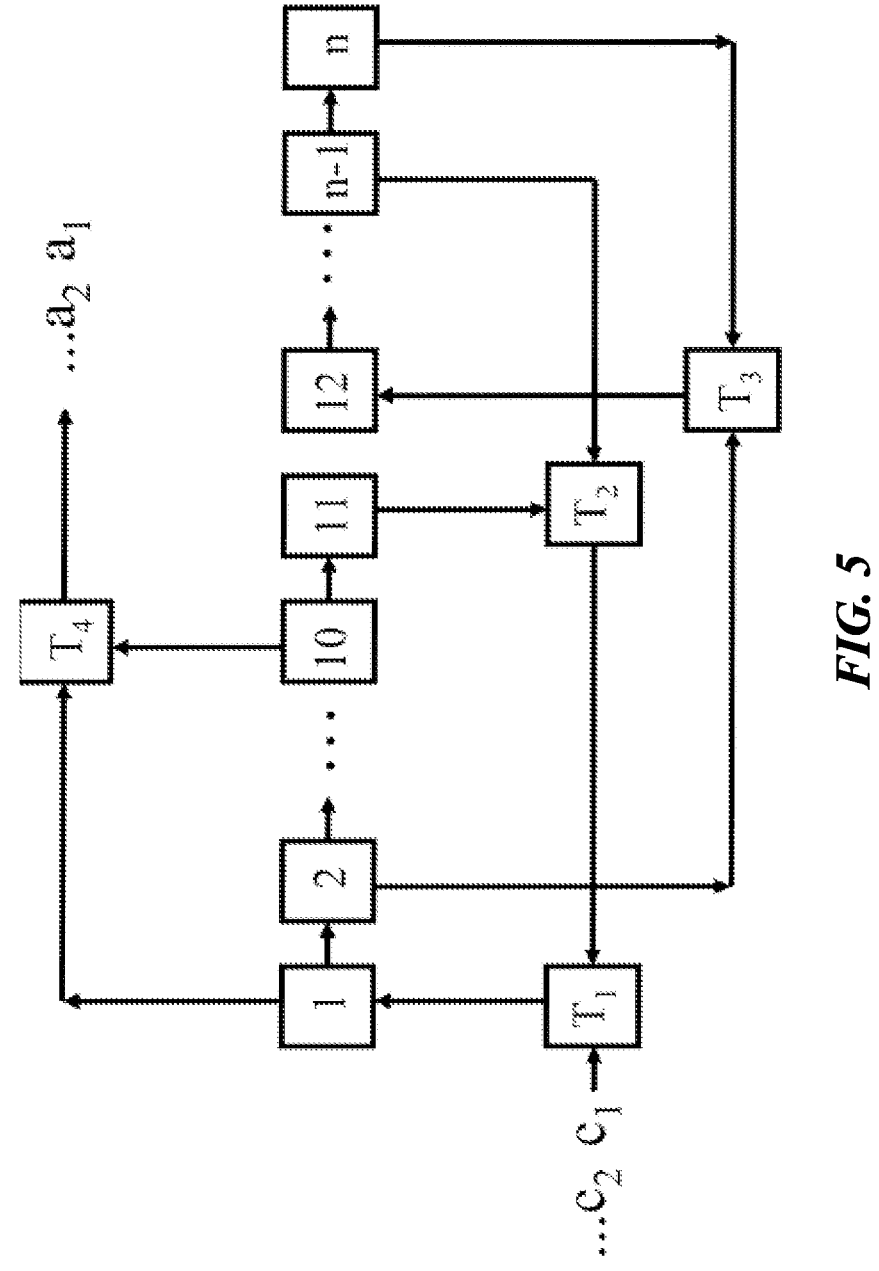
FIG. 5 illustrates a random number generator, which is used to produce a series of numbers that may be used in certain exemplary embodiments illustrative of how a different set of Transformation Rules can be produced by a different set of Control Characters.

For example, in the above simple example which we used to produce a 128-bit encryption key, the set of Control Characters is the set of characters which are used as the input to the random number generator shown in FIG. 5. Such a random number generator will produce a series of numbers (3, 7, 2, 6, 4, 2, 3, 4, 2, 5, 4, 4, 6, 7, 5, 9), which indicate the number of characters that will be skipped. As a result, a new set of numbers is produced as (3, 10, 12, 18, 22, 24, 27, 31, 33, 38, 42, 46, 52, 59, 64, and 73), which we used to select the characters from the identification data as explained in the previous example of Transformation Rules.

As shown in FIG. 5, a random number generator is composed of a stage machine with "n" stages and each stage stores one character. $T_1, T_2, T_3, T_4$ are transformations which consist of bit operations such as "binary additions," "exclusive OR," etc. $C_1, C_2$, et al. are Control Characters which are the input to the random number generator, and a 1, a 2, et al. are the random number produced by the random number generator, i.e., (3, 7, 2, 6, 4, 2, 3, 4, 2, 5, 4, 4, 6, 7, 5, 9) in this example. It is apparent in this example that a different set of Control Characters will produce a different set of random numbers. Furthermore, a different set of initial states of the random number generator will produce a different set of random numbers even with the same set of Control Characters. Similarly, a different structure of the stage machine will produce a different set of random numbers. Therefore, in this example, a different set of Transformation Rules is generated based on a different set of Control Characters. Moreover, by changing the initial states and structure of the random number generator, a different Rule Generating Algorithm can be produced.

The unencrypted Control Characters, the unencrypted account identification information and the Encrypted Transaction Packet are sent to the online counter party, which will forward the unencrypted Control Characters, the unencrypted account identification information and Encrypted Transaction Package to the financial institution that has issued the financial account to the consumer.

Based on the unencrypted Control Characters, the financial institution can use the pre-determined Rule Generating Algorithm to reproduce the set of Transformation Rules. Such set of Transformation Rules will be used to reconstruct the decryption key based on the account holder's identification information of the account which is identified by the unencrypted account identification information. The reconstructed decryption key can be used to decrypt the Encrypted Transaction Packet.

Furthermore, in another embodiment of the present disclosure, the dynamic key construction method can also be changed periodically by the financial institution so that con artists have no way to decode these pre-determined algorithms and rules.

In another embodiment of the present disclosure, instead of selecting bits from the embedded identification information of the government-issued official identification document to construct an encryption key, the set of Transformation Rules is used to select one encryption key from many possible pre-determined encryption keys. The selection decision is made based on the embedded identification information of the government-issued official identification document and time stamp of the transaction. For example, a time stamp of 12:34:47 am on Dec. 23, 2006 can be used as a set of random numbers, i.e., (12, 34, 47, 12, 23, 06), which can be transformed mathematically to select a particular set of characters of the embedded identification information, and that selected set of characters will point to a particular key to be used for the encryption of that transaction.

Since the time stamp is different in each transaction and the consumer is different in each transaction, there is practically no chance for the con artist to identify the encryption key if we have a huge number of possible keys available in the key selection process.

Similarly, in another embodiment of the present disclosure, a set of Control Characters can be used to select a particular set of characters of the embedded identification information, and such set of selected characters will point to a particular key to be used for the encryption of that transaction.

As a result of all these changing factors to produce a dynamic key for data encryption, it is practically impossible for any online merchant, money service business, and con artist to decrypt the Encrypted Transaction Packet. As a result, the embedded identification information of the consumer and the transactional details agreed upon by the consumer are fully protected from any fraud.

As an alternative solution, in one embodiment of the present disclosure, the merchant identification number, the transaction identification number issued by the merchant, the financial account number of the consumer, the transactional details agreed upon by the consumer, and the embedded identification information read from the government issued official identification document of the consumer are directly sent to the financial institution without going through the online organization. Once the financial institution receives the transaction request from the online organization, the financial institution can quickly approve the transaction request if the embedded identification information read from the consumer's government issued official identification document matches the identification information of the financial account holder stored in the database of the financial institution as identified by the financial account number.

To leverage on the existing infrastructure, in one embodiment of the present disclosure, a device interface of the present disclosure can be integrated as part of, an ATM terminal, a check-cashing kiosk, a supermarket checkout stand, parking lot payment kiosk, gas station payment kiosk, coin exchange machine, dash board of a vehicle, self-service terminal, or other type of networked terminals.

In summary, the present disclosure is capable of enhancing the national security by enforcing anti-money laundering, anti-terrorist financing and other anti-crimes measures and also has the potential to make significant reductions in online fraudulent activities.

As contemplated in the described embodiments, one of the possible combinations of the preferred embodiments is given below as an example. A user 100 uses a computer 200 to conduct online transaction with an online merchant 400 or a retail store 600 using the credit/debit card or checking account number issued by financial institution 300 through a network 500 as shown in FIG. 1.

Figure 2A:
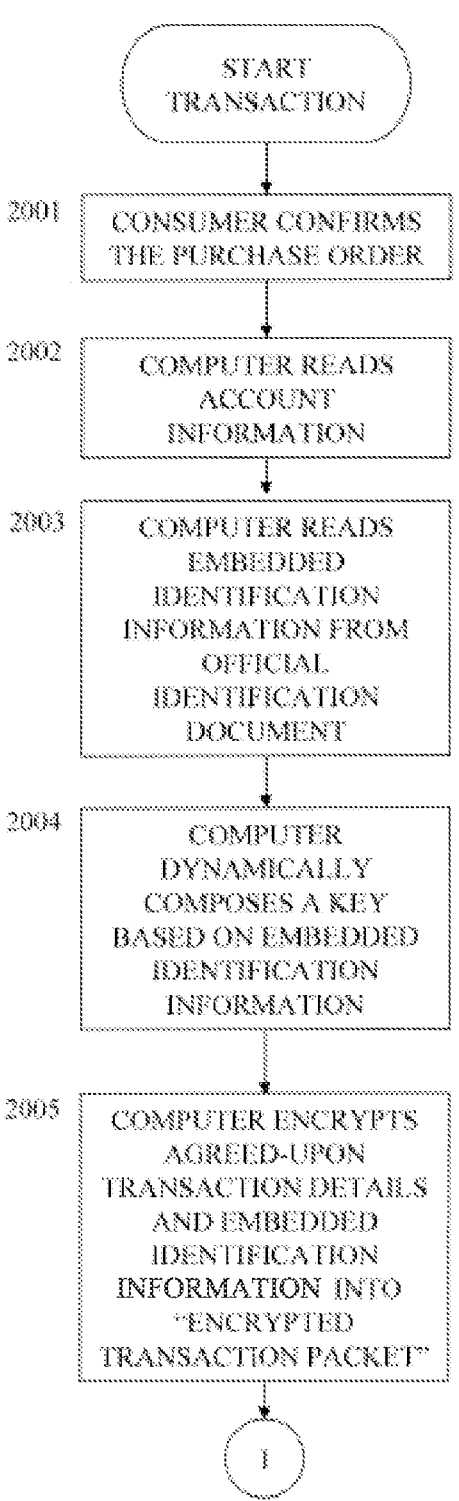
FIG. 2 (comprising FIG. 2A, FIG. 2B, and FIG. 2C) is a set of flow charts indicating how the system and network shown in FIG. 1 conduct such online shopping transactions.
Figure 2B:
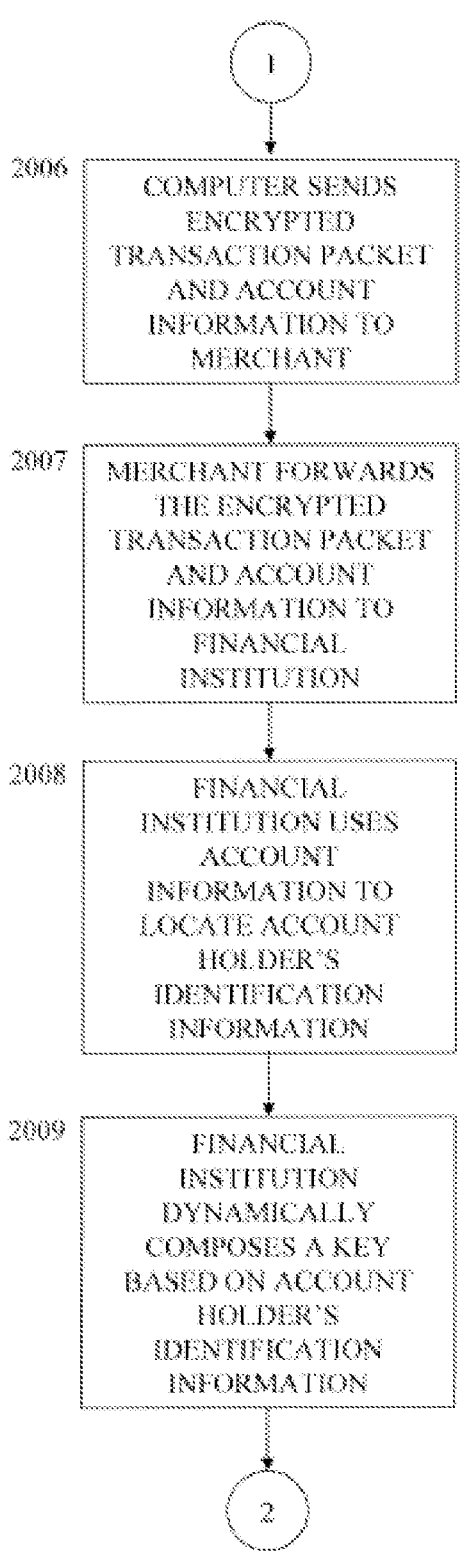
Figure 2C:
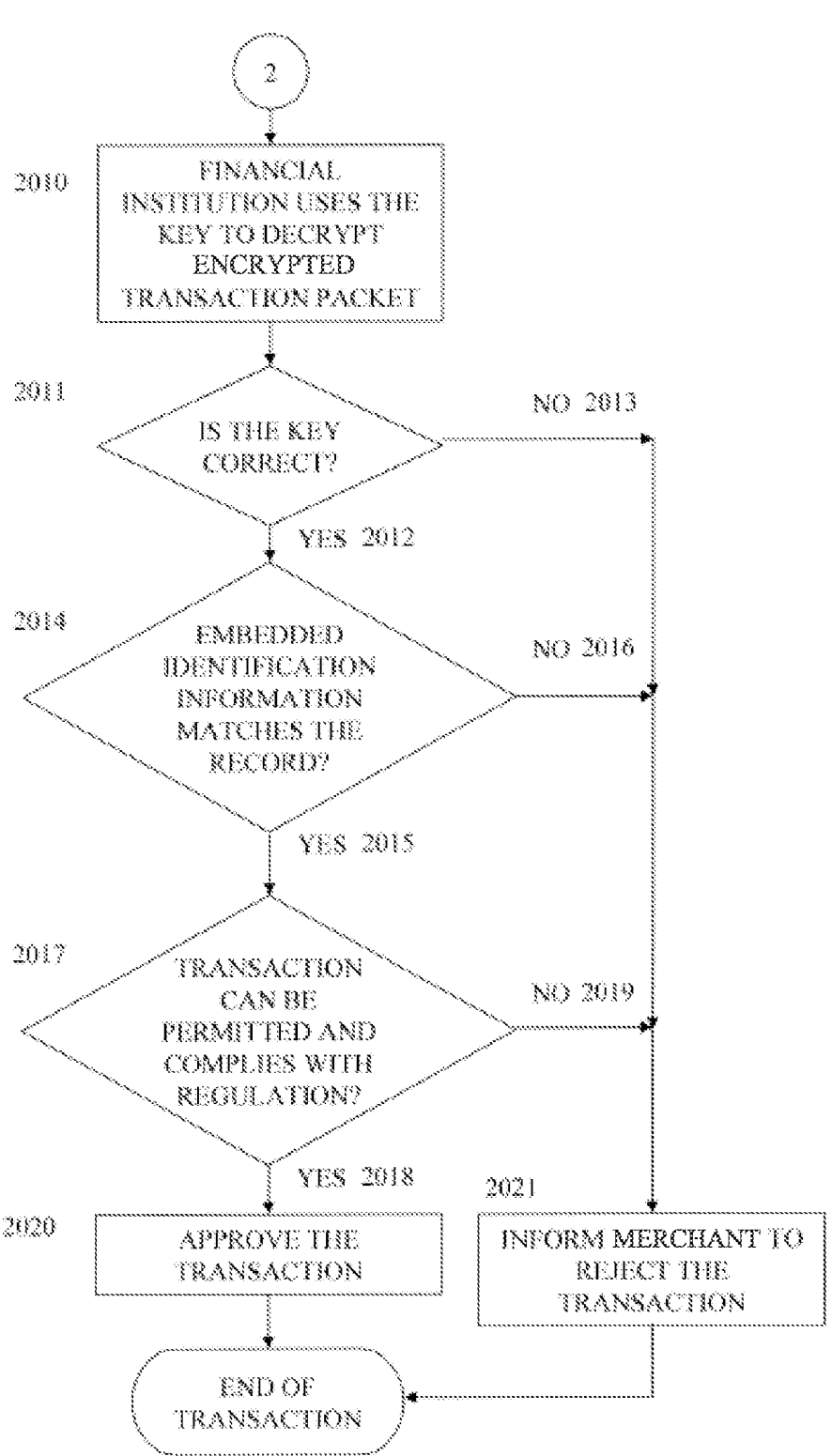

References should also be made to the flowchart of FIG. 2 in combination with the system diagram of FIG. 1, which together illustrate how the system enables a user to conduct secured online transactions with a merchant.

First (block 2001), the user 100 completes his/her online shopping and confirms his/her purchase order.

Then (block 2002), the computer 200 reads the account information from the user's credit/debit card or check through a reader, which can be incorporated in the computer, keyboard, mouse, or any device interface attached to the computer 200. Alternatively, the user can manually enter the account information into the computer based on the traditional approach.

In addition (block 2003), the computer 200 reads the embedded identification information from the user's machine-readable government issued official identification document such as driver's license, passport, etc. The reader of the official identification document can be incorporated in the computer, monitor, keyboard, mouse, or any device interface attached to the computer 200. In fact, it is feasible for the same reader to read both the credit/debit card and the government issued official identification document.

The computer 200 uses the embedded identification information read from the machine-readable government issued official identification document to dynamically compose an encryption key based on pre-determined algorithms and methods (block 2004).

The computer 200 uses the encryption key to encrypt the transaction details agreed-upon by the user and the embedded identification information read from the machine-readable government issued official identification document into an "Encrypted Transaction Packet" (block 2005).

The computer 200 sends the Encrypted Transaction Packet and unencrypted account information to the merchant 400 or retail store 600 (block 2006).

The merchant 400 or retail store 600 forwards the Encrypted Transaction Packet and unencrypted account information to the financial institution 300 which has issued the credit/debit card or checking account (block 2007).

The financial institution 300 uses the account information to locate the account holder's identification information (block 2008).

The financial institution 300 uses the account holder's identification information to dynamically compose a decryption key based on pre-determined algorithms and methods (block 2009).

The financial institution 300 uses the decryption key to decrypt the Encrypted Transaction Packet (block 2010).

If the decryption key does not work correctly (No branch 2013 from decision block 2011), the financial institution 300 informs the merchant or the retail store to reject the transaction (block 2021).

If the decryption key works correctly (YES branch 2012 from decision block 2011), the financial institution 300 compares the embedded identification information sent by the computer 200 with the account holder's identification information to determine whether it is a match (decision block 2014).

If the embedded identification information of the government issued official identification document sent by the computer 200 does not match the account holder's identification information stored in the database of the financial institution as identified by the account information (NO branch 2016), the financial institution 300 informs the merchant or the retail store to reject the transaction (block 2021).

If the embedded identification information of the government issued official identification document sent by the computer 200 matches the account holder's identification information stored in the database of the financial institution as identified by the account information (YES branch 2015), the financial institution 300 then determines (1) whether the status of the account permits such transaction and (2) whether the transaction complies with regulatory requirement such as anti-money laundering, anti-terrorist financing and other anti-crimes laws (decision block 2017).

If either the status of the account does not permit such transaction or the transaction cannot be approved according to the regulatory requirement (NO branch 2019), the financial institution 300 then informs the merchant or the retail store to reject the transaction (block 2021).

If the status of the account permits such transaction and the transaction can be approved according to the regulatory requirement (YES branch 2018), the financial institution 300 then approves the transaction (block 2020) and the merchant or the retail store can proceed to provide the goods and services as ordered by the user.

Similarly, another one of the possible combinations of the preferred embodiments is given below as an example. A user 100 uses a computer 200 to conduct online transaction with an online money services provider 400 or a retail money services provider 600, which is traditionally referred to as a Money Services Business ("MSB"), using the credit/debit card or checking account number issued by financial institution 300 through a network 500 as shown in FIG. 3.

Figure 3:
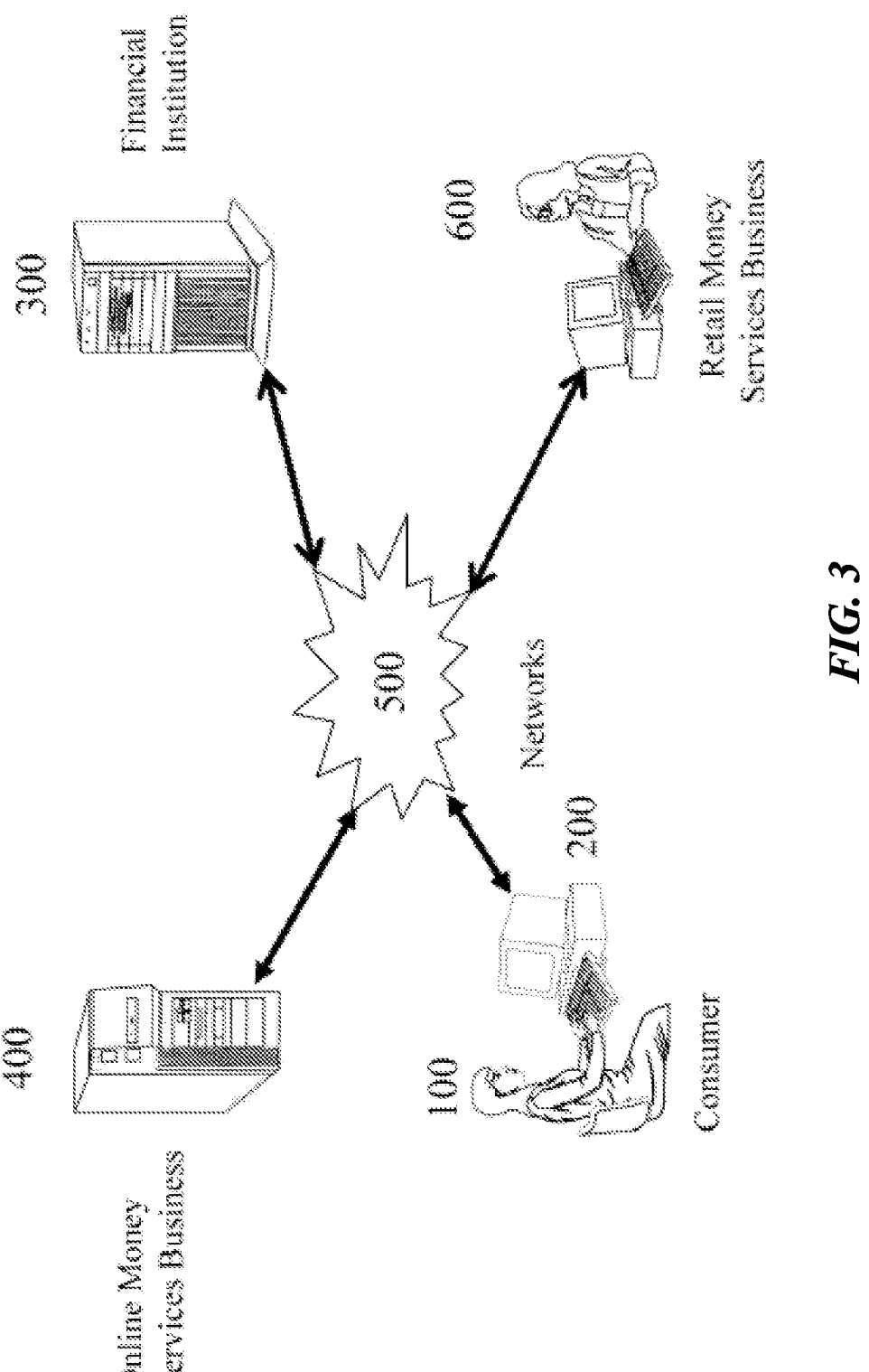
FIG. 3 illustrates the system and network diagram of an exemplary Anti-Crimes Online Transaction System, which enables a person to conduct online money services transactions with the provisions to strengthen the national security and eliminate fraudulent activities.
Figure 4A:
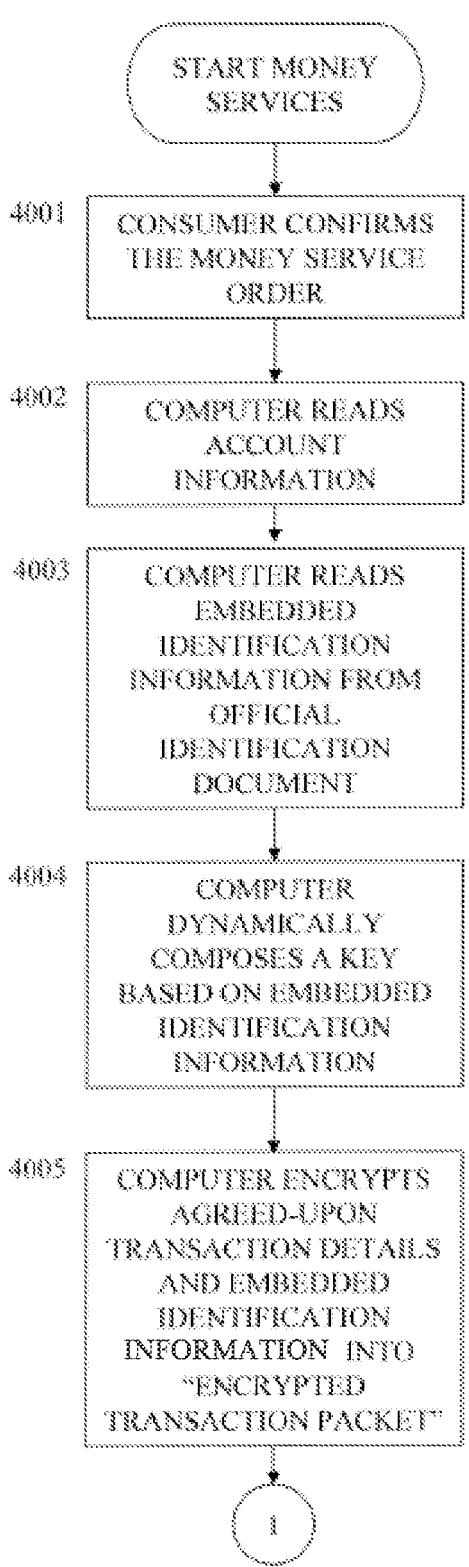
FIG. 4 (comprising FIG. 4A, FIG. 4B, and FIG. 4C) is a set of flow charts indicating how the system and network shown in FIG. 3 conduct such online financial transactions.
Figure 4B:
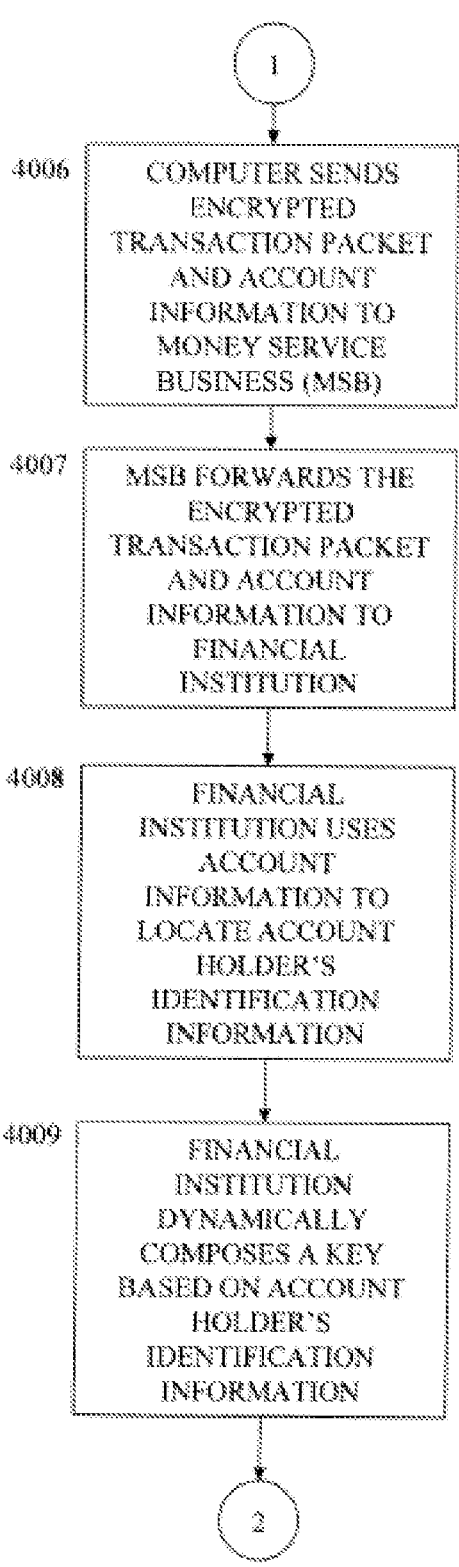
Figure 4C:
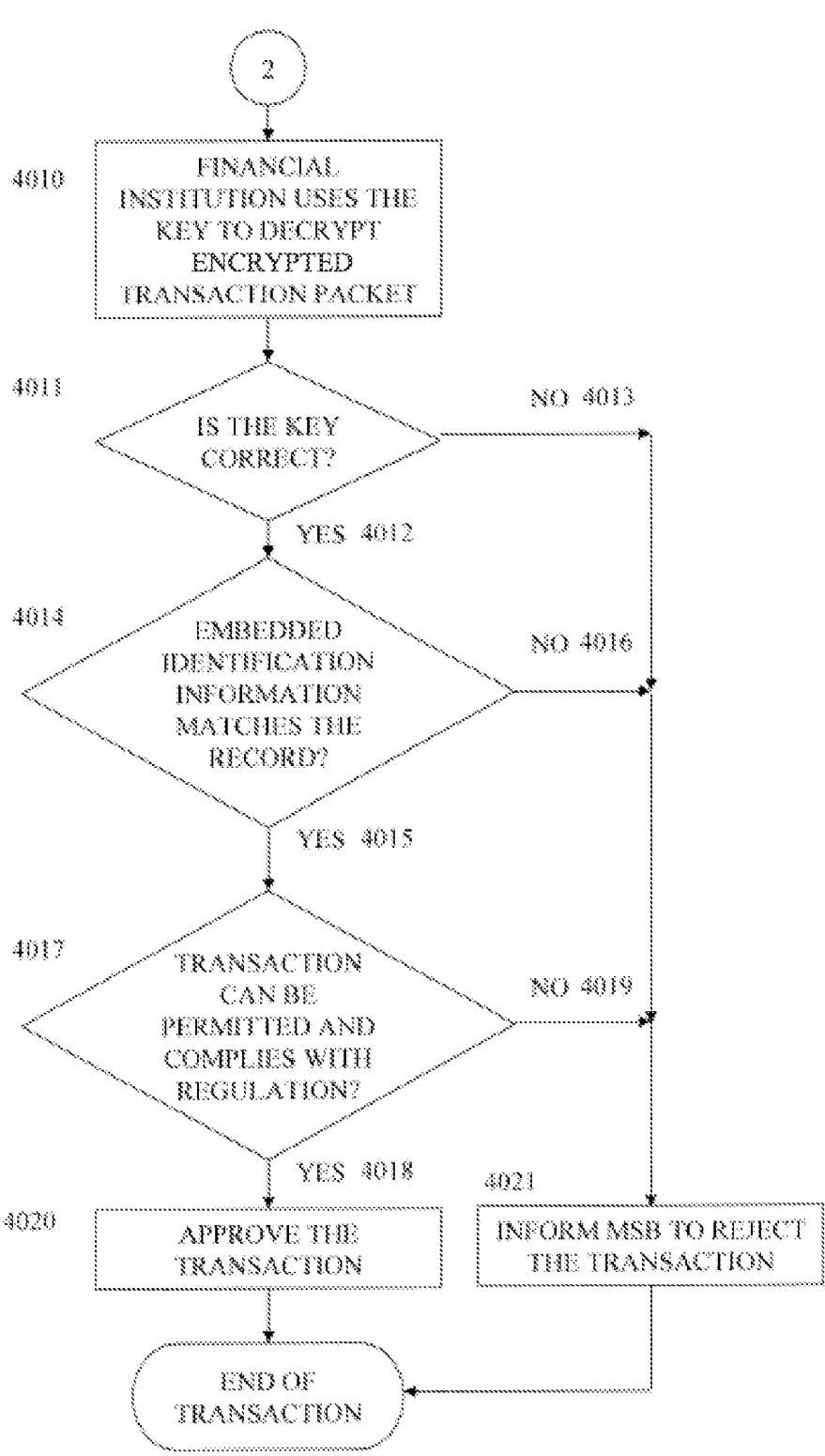

References should also be made to the flowchart of FIG. 4 in combination with the system diagram of FIG. 3, which together illustrate how the system enables a user to conduct secured online transactions with an MSB.

First (block 4001), the user 100 fills in his/her money services request and confirms the service order. If the requested money service is a fund transfer to a recipient who does not have a financial account, the recipient's identification information may be entered into the money service request form in order to comply with most regulatory requirements.

Then (block 4002), the computer 200 reads the account information from the user's credit/debit card or check through a reader, which can be incorporated in the computer, monitor, keyboard, mouse, or any device attached to the computer 200. Alternatively, the user can manually enter the account information into the computer based on the traditional approach.

In addition (block 4003), the computer 200 reads the embedded identification information from the user's machine-readable government issued official identification document such as driver's license, passport, etc. The reader of the official identification document can be incorporated in the computer, monitor, keyboard, mouse, or any device attached to the computer 200.

The computer 200 uses the embedded identification information read from the user's machine-readable government issued official identification document to dynamically compose an encryption key based on pre-determined algorithms and methods (block 4004).

The computer 200 uses the encryption key to encrypt the transaction details agreed-upon by the user and the embedded identification information read from the user's machine-readable government issued official identification document into an "Encrypted Transaction Packet" (block 4005).

The computer 200 sends the Encrypted Transaction Packet and account information to the online MSB 400 or the retail MSB 600 (block 4006).

The online MSB 400 or retail MSB 600 forwards the Encrypted Transaction Packet and account information to the financial institution 300 which has issued the credit/debit card or checking account (block 4007).

The financial institution 300 uses the account information to locate the account holder's identification information (block 4008).

The financial institution 300 uses the account holder's identification information to dynamically compose a decryption key based on pre-determined algorithms and methods (block 4009).

The financial institution 300 uses the decryption key to decrypt the Encrypted Transaction Packet (block 4010).

If the decryption key does not work correctly (No branch 4013 from decision block 4011), the financial institution 300 then informs the MSB to reject the transaction (block 4021).

If the decryption key works correctly (YES branch 4012 from decision block 4011), the financial institution 300 then compares the embedded identification information sent by the computer 200 with the account holder's identification information to determine whether it is a match (decision block 4014).

If the embedded identification information of the user's machine-readable government issued official identification document does not match the account holder's identification information stored in the database of the financial institution as identified by the account information (NO branch 4016), the financial institution 300 then informs the MSB to reject the transaction (block 4021).

If the embedded identification information of the user's machine-readable government issued official identification document matches the account holder's identification information stored in the database of the financial institution as identified by the account information (YES branch 4015), the financial institution 300 then determines (1) whether the status of the account permits such transaction and (2) whether the transaction complies with regulatory requirement such as anti-money laundering, anti-terrorist financing and other anti-crimes laws (decision block 4017).

If either the status of the account does not permit such transaction or the transaction cannot be approved according to the regulatory requirement (NO branch 4019), the financial institution 300 then informs the MSB to reject the transaction (block 4021).

If the status of the account permits such transaction and the transaction can be approved according to the regulatory requirement (YES branch 4018), the financial institution 300 then approves the transaction (block 4020) and MSB will provide money services to the user according to his/her service order.

Through the above two examples, it is evident that the present disclosure can be used for all kinds of online activities. Since the official identification documents or instruments are used in the transaction, and by appropriate use of the information embedded in those official identification documents or instruments to complete the transaction in accordance with the present disclosure, it is thus possible for such a transaction to be fully complaint with the requirements of the Bank Secrecy Act, the USA PATRIOT Act and other equivalent laws.

Those skilled in the art will recognize that the described embodiments can be assembled in various ways to form a variety of applications based on the need, and that obvious alterations and changes in the described structure may be practiced without meaningfully departing from the principles, spirit, and scope of this disclosure. Accordingly, such alterations and changes should not be construed as substantial deviations from the present disclosure as set forth in the appended claims.

What is claimed is:

1. A computer-implemented method for validating a user instruction, comprising:

storing, at a first computer system, a transformation method associated with account information of the user, and associated with a government issued identification document of the user, the account information obtained from an item issued by a financial institution;

receiving, at the first computer system from a second computer system, the account information and a message electronically transformed from the user instruction by the transformation method based on the government issued identification document of the user, the user instruction being unrecognizable from the message;

transforming, at the first computer system, the message into the user instruction with the transformation method retrieved based on the received account information; and approving an action based on the user instruction.

2. The computer-implemented method of claim 1, in which the account information comprises an account identification number.

3. The computer-implemented method of claim 1, in which the government issued identification document comprises at least one of a driver's license, a passport, an alien identification card, a resident identification card, a student identification card, a national identification card, a state identification card, an insurance identification card, a social security identification card, a voter identification card, a certificate of legal status, or a combination thereof.

4. The computer-implemented method of claim 1, in which the transformation method comprises at least an encryption method, a decryption method, or a combination thereof.

5. The computer-implemented method of claim 1, in which the financial institution comprises at least one of a bank, credit union, money services business, financial holding company, insurance company, insurance agency, mortgage company, mortgage agency, stockbroker, stock agency, bond broker, bond agency, commodity broker, commodity agency, trading company, trading agency, other financial service provider, other financial agency, stock exchange, commodity exchange, currency exchange, bond exchange, other exchange, funds manager, investment company, private equity firm, venture capital firm, virtual currency company, merchant acquirer, payment processor, payment card issuer, payment card program manager, internet merchant, other organization related to financial services, or a combination thereof.

6. The computer-implemented method of claim 1, in which the user instruction is associated with at least one of banking, trading, money transfer, shopping, payment, a financial transaction, an electronic money services transaction, or a combination thereof.

7. The computer-implemented method of claim 6, in which the financial transaction is associated with at least one of cash, check, wire transfer, ATM (Automated Teller Machine), ACH (Automated Clearing House), credit card, debit card, prepaid card, electronic fund transfer, account opening, account closure, an account application, deposit, withdrawal, cancellation, balance check, inquiry, credit, debit, or a combination thereof.

8. The computer-implemented method of claim 1, in which the first computer system is associated with at least one of an organization, an individual, or a combination thereof.

9. The computer-implemented method of claim 1, in which the second computer system is associated with at least one of an organization, an individual, or a combination thereof.

10. A first computer system for validating a user instruction, comprising:

a processor; and a memory coupled with the processor and storing instructions operable, when executed by the processor, to cause the first computer system:

to store a transformation method associated with account information of the user, and associated with a government issued identification document of the user, the account information obtained from an item issued by a financial institution;

to receive from a second computer system the account information and a message electronically transformed from the user instruction by the transformation method based on the government issued identification document of the user, the user instruction being unrecognizable from the message;

to transform the message into the user instruction by the transformation method retrieved based on the received account information; and to approve an action based on the user instruction.

11. A non-transitory computer-readable medium of a first computer system having program code recorded thereon for validating a user instruction, the program code executed by a processor and comprising:

program code to store a transformation method associated with account information of the user, and associated with a government issued identification document of the user, the account information obtained from an item issued by a financial institution;

program code to receive from a second computer system the account information and a message electronically transformed from the user instruction by the transformation method based on the government issued identification document of the user, the user instruction being unrecognizable from the message;

program code to transform the message into the user instruction by the transformation method retrieved based on the received account information; and program code to approve an action based on the user instruction.

* * * * *